US010230238B2

(12) United States Patent
Naden et al.

(10) Patent No.: US 10,230,238 B2
(45) Date of Patent: Mar. 12, 2019

(54) DROOP COMPENSATION USING CURRENT FEEDBACK

(71) Applicant: NANTENERGY, INC., Scottsdale, AZ (US)

(72) Inventors: Mark Naden, Oro Valley, AZ (US); Ramkumar Krishnan, Scottsdale, AZ (US)

(73) Assignee: NANTENERGY, INC., Scottsdale, AZ (US)

( * ) Notice: Subject to any disclaimer, the term of this patent is extended or adjusted under 35 U.S.C. 154(b) by 646 days.

(21) Appl. No.: 14/039,285

(22) Filed: Sep. 27, 2013

(65) Prior Publication Data

US 2014/0091631 A1  Apr. 3, 2014

Related U.S. Application Data

(60) Provisional application No. 61/707,478, filed on Sep. 28, 2012.

(51) Int. Cl.
*H02J 1/10* (2006.01)
*H02M 3/158* (2006.01)
*H02M 1/00* (2006.01)

(52) U.S. Cl.
CPC ............ *H02J 1/102* (2013.01); *H02M 3/1584* (2013.01); *H02M 2001/0025* (2013.01); *Y10T 307/707* (2015.04)

(58) Field of Classification Search
CPC .. H02H 3/20; G05F 1/10; G05F 1/656; B60Q 1/14; H02M 3/04; H02M 3/1584; H02J 1/102; Y10T 307/07

(Continued)

(56) References Cited

U.S. PATENT DOCUMENTS

| 6,969,976 B1 * | 11/2005 | Broach | H02M 3/156 323/222 |
| 2006/0077604 A1 * | 4/2006 | Jansen | H02J 1/102 361/90 |

(Continued)

FOREIGN PATENT DOCUMENTS

| CA | 2847979 | 10/2014 |
| JP | 08-289468 A | 1/1996 |

(Continued)

OTHER PUBLICATIONS

Lee et al., Metal-Air Batteries with high Energy Density: Li-Air versus Zn-Air, Jan. 1, 2011.*

(Continued)

*Primary Examiner* — Daniel Kessie
*Assistant Examiner* — Swarna N Chowdhuri
(74) *Attorney, Agent, or Firm* — Pillsbury Winthrop Shaw Pittman, LLP (57) ABSTRACT

A system includes a boost converter configured to amplify input voltage received from one or more power sources into output voltage. The system also includes a current sensor configured to sense a current of the input voltage for example, by induction. The system further includes a controller configured to adjust an amplification of the boost converter in response to the current sensed by the current sensor. When utilized in each of a plurality of power source modules coupled to a common load, the power source modules adjust the amplifications of their boost converters towards equalization of their output voltages and their currents in response to sensed currents of the input voltages changing through demand of the common load. Associated systems and methods are also disclosed.

16 Claims, 2 Drawing Sheets

(58) Field of Classification Search
USPC .......................................................... 307/82
See application file for complete search history.

(56) References Cited

U.S. PATENT DOCUMENTS

| | | | | |
|---|---|---|---|---|
| 2010/0066169 | A1* | 3/2010 | Apfel | H02M 3/156 307/31 |
| 2011/0198998 | A1* | 8/2011 | Kasaba | H02M 3/1582 315/77 |
| 2011/0199062 | A1* | 8/2011 | Singnurkar | H02M 3/1582 323/282 |
| 2012/0007432 | A1* | 1/2012 | Rice | H02J 1/00 307/82 |
| 2012/0043823 | A1* | 2/2012 | Stratakos | H02J 3/383 307/82 |
| 2013/0121033 | A1 | 5/2013 | Lehn et al. | |
| 2013/0328403 | A1* | 12/2013 | Kaufman | H02J 3/385 307/77 |
| 2014/0070612 | A1* | 3/2014 | Stoger | H05B 33/0815 307/31 |
| 2014/0265567 | A1 | 9/2014 | Zubieta et al. | |
| 2015/0162840 | A1 | 6/2015 | Frost et al. | |
| 2016/0043556 | A1 | 2/2016 | Zubieta | |

FOREIGN PATENT DOCUMENTS

| | | |
|---|---|---|
| JP | 2001095232 A | 4/2001 |
| JP | 2004304960 A | 10/2004 |
| JP | 2006-136146 A | 5/2006 |
| JP | 2008-131750 A | 6/2008 |
| JP | 2011-10464 A | 1/2011 |
| JP | 2011-130562 A | 6/2011 |
| JP | 2012-060723 A | 3/2012 |
| WO | 2009/107680 A1 | 9/2009 |
| WO | WO 2013/166579 | 11/2013 |

OTHER PUBLICATIONS

Jang-soo Lee, Nam-Soon Choi, Meilin Liu, Metal-Air Batteries with High Energy Density: Li-Air versus Zn-Air, Jan. 2011, Advanced Energy Materials.*
Jang-soo Lee, Meilin Liu, Nam-Soon Choi, Metal-Air Batteries with High Energy Density: Li-Air versus Zn-Air, Jan. 2011, Advanced Energy Materials.*
Australian Office Action dated Sep. 5, 2016 for Appln. No. 2013323342.
Caponio, F. et al., 'Modular and Bi-Directional Energy Storage System Compliant with Accumulators of Different Chemistry', IEEE 11th International Conference on Electrical Power Quality and Utilisation (EPQU), Oct. 17-19, 2011, pp. 1-6.
Chinese Office Action dated Sep. 2, 2016 for Appln. No. 2013800591325.
Caponio et al., "Modular and Bi-Directional Energy Storage System Complaint with Accumulators of Different Chemistry"; Oct. 19, 2011, pp. 1-6.
English translation Non-Final Office Action Japanese Patent Application No. 2015-534745 dated Jun. 27, 2017.
Office Action Japanese Patent Application No. 2015-534745 dated Sep. 26, 2017 with English translation.
The Third Office Action Chinese Patent Application No. 201380059132.5 dated Jan. 12, 2018 with English translation.
International Preliminary Report of Patentability dated Dec. 31, 2014 for PCT/US2013/062208.
English translation Non-final Office Action Japanese Patent Application No. 2018-011455 dated Dec. 25, 2018.

* cited by examiner

DROOP COMPENSATION USING CURRENT FEEDBACK

The present application claims priority to U.S. Provisional Application Ser. No. 61/707,478, filed Sep. 28, 2012, the entirety of which is hereby incorporated herein by reference.

FIELD

The present invention is generally related to power sources, and more particularly to controllers associated therewith.

BACKGROUND

It is often advantageous to couple different power sources together to supply a greater quantity of power than achievable by any individual source. For example, electrochemical cells are often coupled together to form electrochemical cell systems (i.e., batteries). In some electrochemical cell systems, it may be advantageous to control each electrochemical cell therein, or subsets of the electrochemical cells therein, so as to increase overall system efficiency in supplying power to a load. For example, where one or more electrochemical cells (e.g., grouped into modules) in the electrochemical cell system fail or experience a performance drop relative to the other electrochemical cells or modules, it may be desirable to attempt to equalize currents between different cells, while sharing power between the modules. In particular, generally equal module lifespan across the system may be based more on the current draw associated with each module than on the total energy or power supplied by the module. Such a configuration may facilitate a uniform replacement schedule for modules in the system by generally equalizing the lifespans of each of the modules of the system.

Conventionally, to share currents across electrochemical cells, slave cells or modules are tied to a master cell or module, so that the master cell or module establishes the current draw for the system. Where the master cell or module fails or experiences other performance degradation, however, the entire system's performance may correspondingly degrade. Among other disadvantages, this conventional method fails to maintain the independence of modules.

Accordingly, the disclosure of the present application endeavors to accomplish these and other results.

SUMMARY

According to an embodiment, a system includes a boost converter configured to amplify input voltage received from one or more power sources into output voltage. The system also includes a current sensor configured to sense a current of the input voltage. Current can be measured by a magnetic method (i.e. induction) or purely resistive method (i.e. precise resistor) or a combination of these methods. The system further includes a controller configured to adjust an amplification of the boost converter in response to the current sensed by the current sensor.

According to another embodiment, a system includes a plurality of power source modules. Each power source module includes a boost converter configured to amplify input voltage received from one or more power sources into output voltage. Each power source module also includes a current sensor configured to sense a current of the input voltage for example, by induction. Each power source module further includes a controller configured to adjust an amplification of the boost converter in response to the current sensed by the current sensor. The plurality of power source modules are coupled to a common load through the output voltage. The plurality of power source modules adjust the amplifications of their boost converters towards equalization of their output voltages and their currents in response to sensed currents of the input voltages changing through demand of the common load.

According to another embodiment, a method of equalizing current across a plurality of power sources coupled to a common load includes, for each of the power sources, amplifying, using a boost converter, input voltage received from one or more power sources into output voltage. For each of the power sources, the method also includes sensing, using a current sensor, a current of the input voltage by induction. For each of the power sources, the method further includes adjusting an amount of said amplifying in response to the current sensed by the current sensor. By adjusting the amount of said amplifying, the plurality of power sources approach a stable equilibrium of output voltages and currents.

Other aspects of the present invention will become apparent from the following detailed description, the accompanying drawings, and the appended claims.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Figure 1:
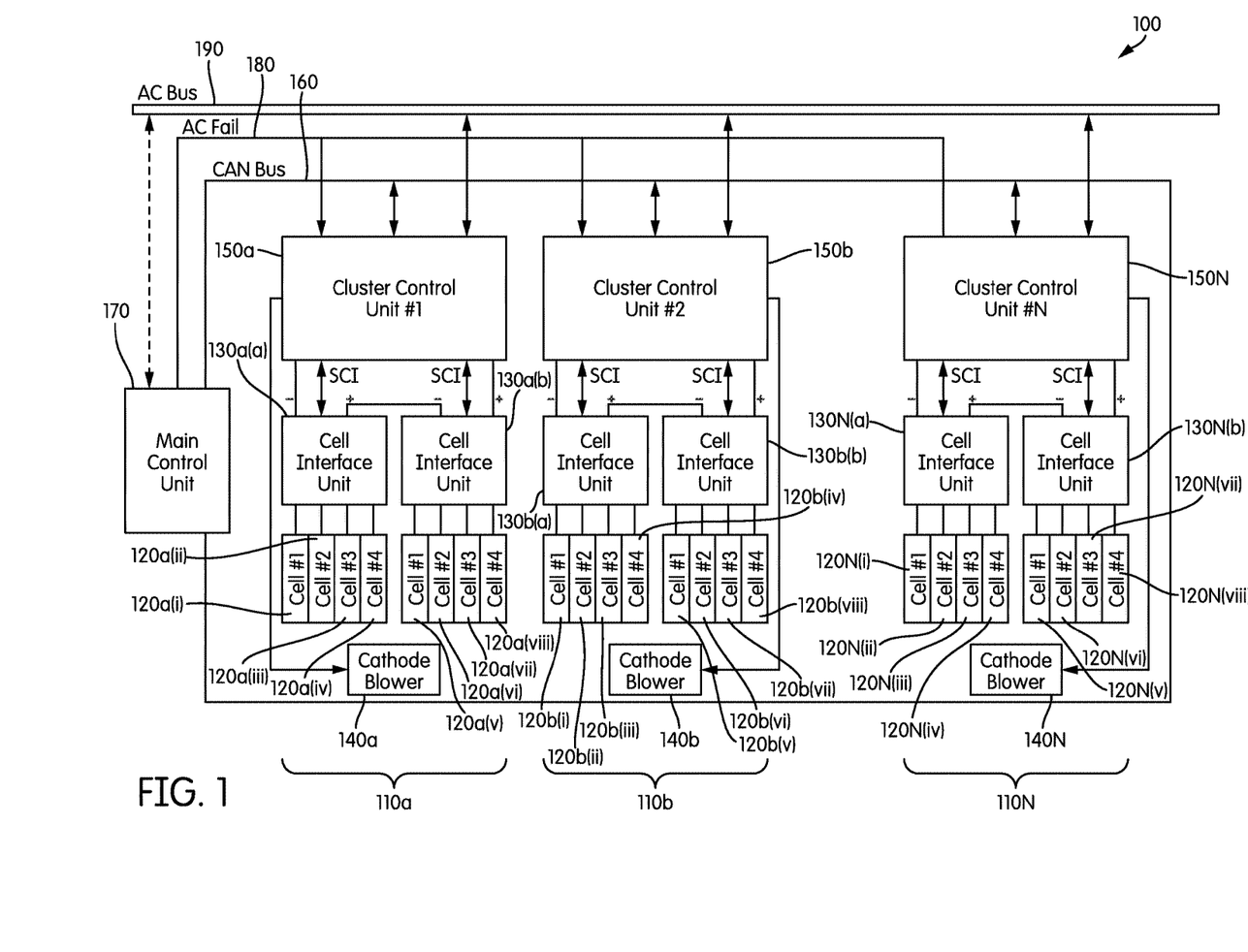
FIG. 1 depicts a schematic view of an electrochemical cell system having a plurality of modules, each containing a plurality of electrochemical cells therein.

FIG. 1 illustrates a schematic view of an electrochemical cell system 100. In the illustrated embodiment, the electrochemical cell system 100 includes a plurality of cell modules 110 (individually cell modules 110a, 110b, and 110N-N being an integer of 3 or more), each including a plurality of electrochemical cells therein. It may be appreciated that the electrochemical cell system 100 may include any appropriate number of cell modules 110 therein (e.g., two or more). In various embodiments, the cell modules 110 may include a different number of electrochemical cells 120 therein. In the illustrated embodiment, each module 110 includes eight electrochemical cells 120 (specifically, electrochemical cells 120a(i-viii) in cell module 110a, electrochemical cells 120b(i-viii) in cell module 110b, and electrochemical cells 120N(i-viii) in cell module 110N).

In an embodiment the electrochemical cells 120 of each cell module 110 may be subdivided into two interface groups, each having an associated cell interface unit 130. As shown, cell interface unit 130a(a) may group cells 120a(i)-(iv), while cell interface unit 130a(b) may group cells 120a(v)-(viii). Similarly, cell interface unit 130b(a) may group cells 120b(i)-(iv), while cell interface unit 130b(b) may group cells 120b(v)-(viii). Furthermore, cell interface unit 130N(a) may group cells 120N(i)-(iv), while cell interface unit 130N(b) may group cells 120N(v)-(viii). In an embodiment, the cell interface units 130 may link the cells 120 associated therewith in series. Additionally, the cell interface units 130 may themselves be linked in series. As such, the voltage of each of the cells 120 in a given cell module 110 may add up. In the illustrated embodiment, with eight electrochemical cells 120 in each cell module 110, if each electrochemical cell 110 supplies 1 VDC volt, then the eight cells 120 in series may supply 8 VDC. It may be appreciated that different cell modules 110 may supply different voltages (e.g., one cell module supplies 8 VDC, while another supplies 6 VDC).

While the electrochemical cells 120 may vary across embodiments, in some embodiments one or more of the cells 120, and/or other features of the electrochemical cell system 100, may include elements or arrangements from one or more of U.S. patent application Ser. No. 12/385,217 (issued as U.S. Pat. No. 8,168,337), Ser. No. 12/385,489 (issued as U.S. Pat. No. 8,309,259), Ser. No. 12/549,617 (issued as U.S. Pat. No. 8,491,763), Ser. Nos. 12/631,484, 12/776,962, 12/885,268, 13/028,496, 13/083,929, 13/167,930, 13/185, 658, 13/230,549, 13/299,167, 13/362,775, 13/531,962, 13/532,374 13/566,948, and 13/668,180, each of which are incorporated herein in their entireties by reference. That is, the cells (and the system made up of those cells) may be a rechargeable power source (also referred to as secondary cells), which may be charged by an external power source (e.g., solar cells, wind turbines, geothermally generated electricity, hydrodynamically generated electricity, engine/brake generated electricity, the main power grid, etc.) and discharged as needed/desired (e.g., as back-up power, to discharge stored power, in lieu of a fossil fuel engine, etc.).

In some embodiments the cell interface units 130 may be configured to monitor the status of each cell 120 associated therewith, and may provide switching or other functionality configured to isolate or otherwise bypass faulty cells 120, such as is described in U.S. patent application Ser. No. 13/299,167, incorporated by reference above. As another example, in embodiments where one or more of the electrochemical cells 120 are metal-air cells, the cells 120 may be utilized at least in part to power a cathode blowers 140 (individually cathode blowers 140*a*, 140*b*, and 140N as illustrated) associated with the cell modules 110, which may be configured to direct a flow of air or other oxidant to oxidant electrodes associated with each of the cells 120, as described in U.S. patent application Ser. No. 13/531,962, entitled "Immersible Gaseous Oxidant Cathode for Electrochemical Cell System," incorporated by reference in its entirety above.

For each module 110, a cluster control unit 150 (individually cluster control units 150*a*, 150*b*, and 150N in the illustrated embodiment) links the cell interface units 130, and provides programmatic control thereof via a serial communications interface (SCI) associated with each. The cluster control units 150 may be linked to each other through a Controller Area Network (CAN) Bus 160. Programmatic or other control of the cell modules 110 may be provided from a main control unit 170, which may also be linked to the CAN Bus 160. Embodiments of such programmatic control are described in greater detail below. In some embodiments, such as that illustrated, an AC Fail circuit 180 may also be implemented in the electrochemical cell system 100, and may be coupled to the main control unit 170 and each of the cluster control units 150. The AC Fail circuit 180 may be configured to direct the cluster control units 150 of the cell modules 110 to supply power to an AC Bus 190 on an as-needed basis. For example, if AC power on the grid fails, the AC Fail circuit 180 may be configured to draw power from the electrochemical cells 120. It may be appreciated that in some embodiments the AC Bus 190 may generally receive DC power from the cell modules 110, however may be associated with an inverter configured to convert the DC power to AC power. In other embodiments, each cell module 110 may include one or more inverters, configured to supply AC voltage across the AC Bus 190. In some embodiments, the AC Bus 190 may be coupled to the main control unit 170 (e.g., through any appropriate sensor or sensing system), as illustrated by the dashed line therebetween in FIG. 1. In an embodiment, the main control unit 170 may control an inverter associated with the AC bus 190. In some embodiments, the functions of the AC Fail circuit 180 may be combined with the CAN Bus 160, or any other appropriate another control link.

It may be desirable to perform droop compensation in the electrochemical cell system 100, so as to facilitate equalization of currents, which may correspondingly equalize a lifecycle of the cell modules 110 and the electrochemical cells 120 therein. By equalization of currents, it may be understood that the droop compensation may facilitate generally or essentially equalizing the currents (e.g., driving the currents towards equalization, into a state generally regarded in the art as being equalized). In an embodiment, droop compensation may be performed utilizing a control circuit associated with a controller in each cluster control unit 150. As such, in some embodiments droop compensation may be performed on a cell module by cell module basis. In other embodiments, droop compensation may be performed among subsets of the cell modules 110, such as by being implemented at the level of the cell interface units 130. In still other embodiments, droop compensation may be performed on a cell by cell basis, being implemented associated with each individual electrochemical cells 120. Other implementations are also possible.

Figure 2:
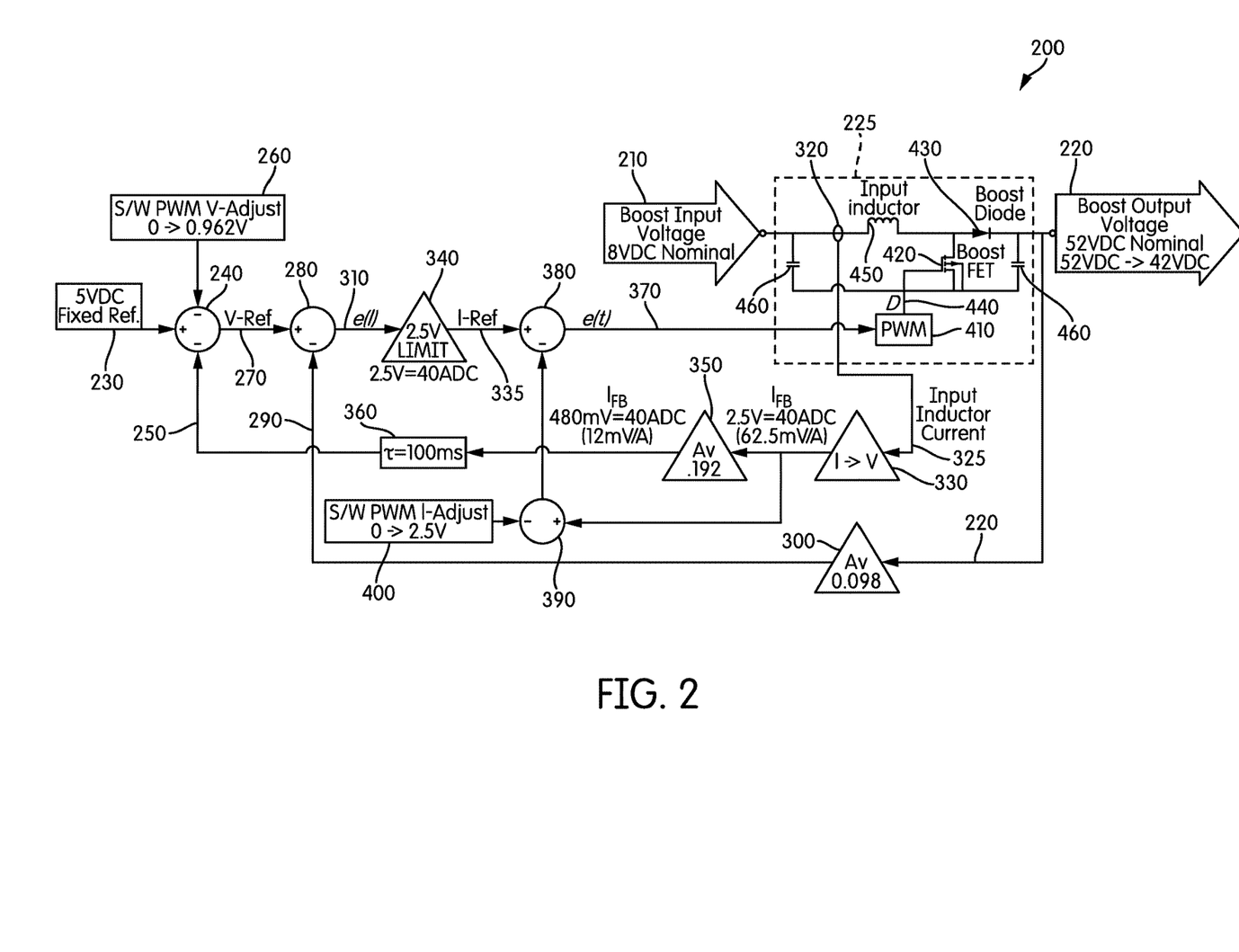
FIG. 2 depicts a schematic control diagram of a control circuit associated with each module, configured to perform droop compensation for an associated module relative to other modules in the electrochemical cell system of FIG. 1.

FIG. 2 illustrates a control block diagram for a control circuit 200 illustrating an example of how droop compensation may be implemented (e.g., on the electrochemical cell system 100) according to an embodiment. In the illustrated embodiment, the control circuit 200 shows that the control scheme operates on a conversion from a boost input voltage 210 to a boost output voltage 220, via a boost circuit 225 (i.e., a converter), described in greater detail below. In the example illustrated, the boost input voltage 210 is shown as being 8 VDC nominal. It may be appreciated that such an input voltage may result from the summation in series of each of the eight electrochemical cells 120 associated with each electrochemical cell module 110, outputting 1 VDC each. Additionally, as shown, in an embodiment the boost output voltage 220 may be stepped up (i.e., amplified) to 52 VDC nominal by the boost circuit 225. In the example illustrated, the 52 VDC→42 VDC range may be based on telecom requirements, wherein all loads are active at 52 VDC, noncritical loads (NCL) drop out at 48 VDC, and only critical loads (CL) are kept active around 42-45 VDC. While having a CL voltage range instead of a fixed value is uncommon, the range may be based on any customer desired range. It may be appreciated that one could adjust scaling factors to accommodate the ranges. As described in greater detail below, the amplification of the boost circuit 225 may be variable, so as to provide the desired droop compensation. In an embodiment, the boost output voltage 220 may be output to the AC Bus 190 of the electrochemical cell system 100.

In an embodiment, to perform the droop compensation using the control circuit 200, a fixed reference voltage 230 is received at a first summation junction 240. In the illustrated embodiment, the fixed reference voltage 230 is 5 VDC. It may be appreciated that the 5 VDC may be an exemplary scaling point, and could be anywhere from 1 VDC to 10 VDC in some embodiments, depending on nominal board operating voltage. The fixed reference voltage 230 may be provided by any appropriate source, including, for example, ultimately from one or more of the electrochemical cells 120, or from a separate power source. At the first summation junction 240, the fixed reference voltage 230 may have a first voltage modifier 250 subtracted therefrom. As described in greater detail below, the first voltage modifier 250 may be computed from a sensed current (I) associated with the boost input voltage 210. A software voltage adjustment 260 may also be applied at the first summation junction 240, also being subtracted from the fixed voltage reference 230. In some embodiments, the software voltage adjustment 260 may be computed or otherwise derived from properties of the cell, or may be received as a user input. In an embodiment, the software voltage adjustment 260 may range from 0V to 0.962V, as described in greater detail below. It may be appreciated that the value 0.962 may be calculated as a scaling factor based on the 5 VDC reference. When the scaling factor is at zero, boost output voltage is 52 VDC. When the scaling factor is at 0.962, however, the boost output voltage is 42 VDC. The adjustment alteration may be based on user control of what loads are active (i.e. critical loads, non-critical loads). The value may be any number and is only dependent the boost output voltage range desired. The summation of the fixed reference voltage 230, minus the software voltage adjustment 260 and the first voltage modifier 250, may be output as a voltage reference 270.

The voltage reference 270 may be input into a second summation junction 280. At the second summation junction 280, a second voltage modifier 290 may be subtracted from the voltage reference 270. As shown in the illustrated embodiment, the second voltage modifier 290 may be computed based on the boost output voltage 220, which may form a PI loop (i.e., a proportional-integral loop, wherein the control circuit 200 comprises a PI controller). In particular, in an embodiment, the boost output voltage 220 may be fed into a step down op-amp 300, which in the exemplary embodiment of FIG. 2, has a gain of 0.096. This is so in the illustrated embodiment because the boost output voltage 220 is nominally 52 VDC, while the fixed reference voltage 230 is 5 VDC (52 VDC*0.096≈5 VDC).

If there were no load associated with the boost output voltage 220, then there would be no current associated with the boost input voltage 210. As such, the first voltage modifier 250 associated with the lack of a sensed current would be zero, and (absent any software voltage adjustment 260) the voltage reference 270 would be the same as the fixed reference voltage 230. With the gain of the step down op-amp 300 being associated with the fixed reference voltage 230, in such a situation the voltage reference 270 would be equal to the second voltage modifier 290, resulting in an error output 310, i.e., e(t), of zero. It may be appreciated that where the boost output voltage 220 drops, the second voltage modifier 290 also drops, creating a non-zero error output 310. As described in greater detail below, the error output 310 may be utilized to modify the amplification of the boost circuit 225 from the boost input voltage 210 to the boost output voltage 220, to compensate for the change.

When a load is applied to the boost output voltage 220, the first voltage modifier 250, associated with a current associated with the boost input voltage 210, may adjust the voltage reference 270. Specifically, with the addition of a load, the current associated with the boost input voltage 210 may increase from zero to a positive value. As shown in FIG. 2, to detect the current of the boost input voltage 210, the boost circuit 225 may include therein a current sensor 320. In an embodiment, a wire carrying the boost input voltage 210 may be run through the current sensor 320, which may pick up an associated magnetic field associated therewith, and output an inductor current measurement 325 that is proportional to the magnetic field. The current may be measured by the current sensor 320 as amperes (A). Such an ampere inductor current measurement 325 may be converted into a voltage reading by a current to voltage converter 330 (as the controls implemented in the control circuit 200 may generally operate in voltages). The inductor current measurement 325, as converted to a voltage, may then be fed back through the control circuit 200 to establish the first voltage modifier 250, described above. It may therefore be appreciated that because the first voltage modifier 250 is utilized in establishing the voltage reference 270, the inductor current measurement 325 is also utilized to establish the error output 310. In some embodiments, the current sensor 320 may sense current by other means besides induction. For example, a current sense resistor may be employed with known precision resistance.

As shown, the error output 310 is utilized to establish a current reference 335 (i.e., "I-ref") for the control circuit 200. It may be appreciated that in some embodiments the system implementing the control circuit 200 (e.g., the system 100) may have a current limit of 40 ADC. Such a current limit may correspond to a 2.5 VDC limit in the control circuit 200. It may be appreciated that the 40 ADC limit may be by user requirement, and may be a protection limit so, for example, if customer load sources more than 40 A out of module, this will limit input current from modules. If bus is shorted, 40 A limit will clamp, thus only allowing 40 A for protection purposes. The example selection of a 2.5V limit in the illustrated embodiment is user selected, and in some embodiments could range from approximately 1V to 10V. If bus is overloaded (e.g., a shorted out bus), the output voltage is forced to zero, and the error output will saturate. The saturated error output may command I-ref to go high (however capped by the limit). As an example, with a current swing or a customer demand of 40 A, the boost output voltage will go below 52 VDC, but it is desirable to stay above 48 VDC so as not to drop out critical loads CL. Accordingly, when input current is 40 A, the 480 mV value may be scaled from the 5 VDC exemplary selection, similar to the software adjustments. In the illustrated embodiment, the error output 310 associated with the voltage reference 270 passes through a voltage limiter 340, which limits the error output 310 to 2.5V, corresponding to 40 ADC. The error output 310, as limited by the voltage limiter 340, may be considered the current reference 335. Similarly, because a 40 A limit may exist for the measurement of the current sensor 320, the current to voltage converter 330 may also correspond to a limit of 2.5V, which amounts to 62.5 mV/A. A step down op-amp 350 having a gain or 0.192 may reduce the influence of the inductor current on the control circuit 200 to 12 mV/A (480 mV=40 ADC). In some embodiments, the reduced voltage associated with the inductor current may then be fed into a timing delay 360. In the illustrated embodiment, the timing delay 360 may be for 100 ms. Other time delays are also possible in other embodiments. It may be appreciated that the timing delay 360 may be configured to slow down the operation of the control loop, which may dampen out the loop of the control circuit 200, to prevent high oscillation before achieving stability, as described in greater detail below. It may be appreciated that some embodiments might not include a timing delay 360, but might include other mechanisms to prevent undesirable oscillation of the loop of the control circuit 200.

The reduced voltage associated with the inductor current, which in the illustrated embodiment results from the step down op-amp 350, and may be time delayed by the timing delay 360, may thus be fed back into the first summation junction 240 as the first voltage modifier 250, which determines the voltage reference 270. Having utilized the inductor current to establish the error output 310 associated with the voltage reference 250, the inductor current may then be utilized to establish an error output 370 associated with the current reference 335. Specifically, the current reference 335, established based on the voltage reference 270 and the reduced boost output voltage 220 (as the second voltage modifier 290) may be adjusted at a third summation junction 380. In an embodiment the inductor current measurement 325, converted to a voltage by the current to voltage converter 330, may be subtracted directly from the current reference 325. In other embodiments, such as that illustrated, a fourth summation junction 390 may allow the inductor current measurement 325, as converted to a voltage, to be modified by a software current adjustment 400. In some embodiments, the software current adjustment 400 may be computed or otherwise derived from properties of the cell, or may be received as a user input. In an embodiment, the software current adjustment 400 may be measured as a voltage, and may be between 0 and 2.5V, corresponding to being between 0 and 40 ADC, as described above. Regardless, by subtracting the inductor current measurement 325 (e.g., as converted to voltage by the current to voltage converter 330, and potentially as modified by the software current adjustment 400) from the current reference 335, the error output 370 associated with the current reference 335 may be computed. The error output 370 may then be received by the boost circuit 225, and may determine an error input for a pulse width modulator 410 thereof. The pulse width modulator 410 may be configured to dictate how much current is drawn by the boost circuit 225, and may be tied into the boost circuit 225 in such a manner so as to modify the boost amplification from the boost input voltage 210 to the boost output voltage 220, as described below.

Because the boost output voltage 220 is fed back through the control circuit 200 in a manner that in part determines the error output 310 associated with the reference voltage 270, and because that boost output voltage 220, in conjunction with the load demands, varies the current supplied in the boost input voltage 210 (sensed by the current sensor 320 as inductor current 325), which is fed back to determine at least in part the voltage reference 270 and the current reference 335, it may be understood that the boost circuit 225 as a whole will modulate the boost in response to current demands associated with the load coupled to the boost output voltage 220. With multiple boost circuits 225 coupled to a common load, where each is controlled by control schemes such as that found in the control circuit 200, the boost circuits 225 are independent from one another in their operation, however may respond to one another through the demands of the load on the associated boost output voltages 220. The operation of this responsiveness is discussed below.

It may be appreciated that the cell or cells associated with whichever one of the boost circuits 225 is outputting a greatest boost output voltage 220 would initially attempt to supply all of the power to the load. The effect of that boost circuit 225 attempting to supply all of the power to the load would be an associated increase in the inductor current, as discussed above. The increase in inductor current then causes the control circuit 200 to droop the boost output voltage 220 for that boost circuit 225. Once the boost output voltage 220 from the boost circuit 225 falls below that of a second boost circuit 225 (having what was previously the second highest boost output voltage 220) the second boost circuit 225 would then itself attempt to supply all of the power to the load. This would cause the second boost circuit 225 to droop its boost output voltage 220. The process would then repeat, creating a cycle where the boost circuits 225 and associated cells attempt to supply all of the power to the load, and the output voltages "droop" in response, which causes other boost circuits 225 and associated cells to continue the cycle. It may be appreciated that the amount by which the boost circuit 225 droops the boost output voltage 220 depends on the error output 370 established based on the current reference 335. For example, where the current reference 335 saturates at the 40 A limit, the boost circuit 225 may droop the boost output voltage 220 close to zero to compensate.

Through the cycle, the different boost circuits 225 and associated cells may oscillate as to which is attempting to fully power the load. Eventually, all boost circuits 225 would trend towards a stable equilibrium, where each of the boost circuits 225 have the same boost output voltage 220 and similarly, have the same current reference 335. Even though the current reference 335 will be driven towards equalization across all controllers, the output current from the boost circuits 225 (e.g., associated with the boost output voltages 220, and coupled in parallel to the load) may be different for each converter. Accordingly, the current associated with the boost input voltage 210 (e.g., as measured by the current sensor 320 as the input inductor current 325) would also be driven towards equalization by the boost circuit 225. It may be appreciated that the equalization of currents, and the common boost output voltage 220 across different cells or cell modules, is independent of the boost input voltage 210 obtained from the cell or cell modules.

Such independent ability of each cell or module to attempt to equalize current may be beneficial to enhance performance and lifespan of the cells of the system. To apply this understanding in the context of the system 100 in FIG. 1, if the control schemes of the control circuit 200 are implemented in each of the cluster control units 150, a load associated with the AC Bus 190 may cause the cluster control units 150 to react to one another, varying the amplification of the boost circuits 225 associated with each to attempt to equalize current demands across the cell modules 110. Thus, if the cell module 110a initially has the highest boost output voltage 220 being output to the AC Bus 190, the electrochemical cells 120a(i-viii) would attempt to supply all of the power to the load, and the current sensor 320 would identify the increased current associated therewith. The sensed current would be fed back through the control circuit 200 of the cell module 110a, causing the boost circuit 225 of the cluster control unit 150a to droop the amplification to supply a smaller boost output voltage 220. If cell module 110b subsequently has the greatest boost output voltage 220, then the electrochemical cells 120b(i-viii) would attempt to supply all of the power to the load via the AC Bus 190, causing a corresponding increase in the current sensed in the cluster control unit 150b. The current would be fed back through the control circuit 200 of the cluster control unit 150b, causing the boost circuit 225 to similarly droop the amplification. This may occur through the boost circuits 225 associated with each of the cluster control units 130 of the cell modules 110, until each of the boost circuits 225 achieve a stabilization point, with generally equal current being drawn by the cell modules 110.

It may be appreciated that the boost circuit 225 may vary across embodiments, and may be of any appropriate configuration. Boost circuits 225 typically include two or more semiconductor switches. For example, in the illustrated embodiment the boost circuit 225 includes a Field Effect Transistor (FET) 420, and a diode 430. The FET 420 opens and closes according to a duty cycle 440 (i.e., "D") provided by the pulse width modulator 410. Boost circuits 225 may further include one or more energy storage elements. In the illustrated embodiment, the boost circuit 225 includes an input inductor 450, and a pair of capacitors 460. In operation, the switching of the FET 420, in conjunction with the stored energy in the input inductor 450 and the capacitors 460, results in the boost output voltage 220 being greater than the boost input voltage 210, with the amount of amplification, in the present embodiment, being variable depending on the duty cycle 440 from the pulse width modulator 410.

It may be appreciated that the control circuit 200 may be implemented in a variety of systems, including but not limited to system 100 of FIG. 1. Further, the source of the boost input voltage 210 may vary across embodiments. While in the illustrated embodiment eight cells (e.g., 120N (i-viii)) are electrically coupled together in series to provide an 8 VDC source for the boost input voltage 210, in other embodiments, the control circuits 200 may be implemented on individual electrochemical cells 120 (e.g., such that the boost input voltage 210 is 1 VDC). It may further be appreciated that the cell modules 110 and/or the electrochemical cells 120 therein may vary across embodiments.

As noted above, in some embodiments, the electrochemical cells 120 may include features from those listed applications incorporated by reference herein. For example, in some embodiments the electrochemical cells 120 may include a plurality of permeable electrode bodies. In some embodiments the plurality of permeable electrode bodies may be configured to be electrically connected to one another through charging of the electrochemical cell 120. In some embodiments the permeable electrode bodies may be selectively coupled to either an anode or a cathode in the electrochemical cell 120 during charging of the electrochemical cell 120, so as to form a plurality of electrochemical cells within each electrochemical cell 120 (e.g., by alternatively associating different permeable electrode bodies with the anode and the cathode, so that fuel grows on some of the permeable electrode bodies towards others of the permeable electrode bodies).

Likewise, during discharge of the cells 120, in some embodiments, the external load associated with the AC Bus 190 may only be coupled to the terminal permeable electrode body, distal from an oxidant reduction electrode of each electrochemical cell 120, so that fuel consumption may occur in series from between each of the permeable electrode bodies. In other embodiments, the external load may be coupled to some of the electrode bodies in parallel, as described in detail in U.S. patent application Ser. No. 12/385,489, incorporated above by reference. In some embodiments, a switching system such as that described in U.S. patent application Ser. No. 13/299,167, incorporated above by reference, may facilitate selective electrical connections between the permeable electrode bodies. In some embodiments, the cells may be configured for charge/discharge mode switching, as is described in U.S. patent application Ser. No. 12/885,268, incorporated by reference above.

In some embodiments including a switching system, switches associated therewith may be controlled by a controller, which may be of any suitable construction and configuration. In the system 100 of FIG. 1, such controllers may be associated with each cell 120, each cell interface unit 130, each cluster control unit 150, or with the main control unit 170. In some embodiments, the controllers may have a hierarchal association with one another, such that a more superior controller (e.g., in the main control unit 170) may transmit commands to lower controllers (e.g., in the cluster control units 150). In some embodiments, one or more of the controllers may include features conforming generally to those disclosed in U.S. application Ser. Nos. 13/083,929, 13/230,549 and 13/299,167, incorporated by reference above. In various embodiments, the control of the switches of a switching system may be determined based on a user selection, a sensor reading, or by any other input. In some embodiments, the controller(s) may also function to manage connectivity between the load and the AC Bus 190, or may selectively supply power (e.g., over the AC Bus 190) to the electrochemical cells 120 for recharging thereof. As noted above, in some embodiments, the controller may include appropriate logic or circuitry for actuating bypass switches associated with each electrochemical cell 120 coupled in the cell interface units 130 or otherwise in the cell modules 110, in response to detecting a voltage reaching a predetermined threshold (such as drop below a predetermined threshold).

The foregoing illustrated embodiments have been provided solely for illustrating the structural and functional principles of the present invention and are not intended to be limiting. For example, the present invention may be practiced using a variety of fuels, oxidizers, electrolytes, and/or overall structural configurations or materials. Thus, the present invention is intended to encompass all modifications, substitutions, alterations, and equivalents within the spirit and scope of the following appended claims.

What is claimed is:
1. A system comprising:
  a plurality of boost converters each coupled to a respective one or more electrochemical cells for receiving an input signal therefrom, each of the boost converters being configured to amplify voltage of the input signal received from its respective one or more electrochemical cells into an output signal, the output signals being supplied simultaneously to a common load;
  a current sensor associated with each of the plurality of boost converters, each current sensor being configured to sense a current of the input signal for its associated boost converter prior to amplification of the input signal by the boost converter; and
  a controller associated with each of the plurality of boost converters, each controller being configured to adjust the voltage amplification of the associated boost converter in response to the current sensed by the associated current sensor, wherein the adjustment decreases the amplification as the current sensed increases based on demand from the load;
  wherein the boost converters and their controllers are independent of one another such that the boost converters operate independently of one another to cause the respective currents of the input signals to trend towards mutual equilibrium, wherein each controller is further configured to:
receive a fixed reference voltage;
adjust the fixed reference voltage in response to the current sensed by the current sensor into a voltage reference;
adjust the voltage reference in response to the output voltage into a current reference; and
adjust the current reference in response to the current sensed by the current sensor into an error output associated with the current reference
wherein each controller is configured to adjust the fixed reference voltage by:
converting the current sensed by the current sensor into a voltage associated with the current;
scaling the voltage associated with the current into a reduced voltage associated with the current and the fixed reference voltage; and
subtracting the reduced voltage from the fixed reference voltage; and
wherein each controller is further configured to adjust the fixed reference voltage by subtracting a software-generated voltage adjustment and wherein the software-generated voltage adjustment is received as a user input.

2. A system comprising:
a plurality of boost converters each coupled to a respective one or more electrochemical cells for receiving an input signal therefrom, each of the boost converters being configured to amplify voltage of the input signal received from its respective one or more electrochemical cells into an output signal, the output signals being supplied simultaneously to a common load;
a current sensor associated with each of the plurality of boost converters, each current sensor being configured to sense a current of the input signal for its associated boost converter prior to amplification of the input signal by the boost converter; and
a controller associated with each of the plurality of boost converters, each controller being configured to adjust the voltage amplification of the associated boost converter in response to the current sensed by the associated current sensor, wherein the adjustment decreases the amplification as the current sensed increases based on demand from the load;
wherein the boost converters and their controllers are independent of one another such that the boost converters operate independently of one another to cause the respective currents of the input signals to trend towards mutual equilibrium,
wherein each controller is further configured to:
receive a fixed reference voltage;
adjust the fixed reference voltage in response to the current sensed by the current sensor into a voltage reference;
adjust the voltage reference in response to the output voltage into a current reference; and
adjust the current reference in response to the current sensed by the current sensor into an error output associated with the current reference,
wherein each controller is configured to adjust the fixed reference voltage by:
converting the current sensed by the current sensor into a voltage associated with the current;
scaling the voltage associated with the current into a reduced voltage associated with the current and the fixed reference voltage; and
subtracting the reduced voltage from the fixed reference voltage; and
further comprising a time delay configured to delay the reduced voltage associated with the current.

3. The system of claim 2, wherein each current sensor is configured to sense the current of the associated input signal by a resistive method.

4. The system of claim 2, wherein each controller is further configured to adjust the amplification of the boost converter in response to the voltage of the output signal.

5. The system of claim 2, wherein the fixed reference voltage is received from the one or more electrochemical cells.

6. The system of claim 2, wherein scaling the voltage comprises reducing the voltage associated with the current relative to the fixed reference voltage and the output voltage.

7. The system of claim 2, wherein each current sensor is configured to sense the current of the associated input signal by induction.

8. A system comprising:
a plurality of boost converters each coupled to a respective one or more electrochemical cells for receiving an input signal therefrom, each of the boost converters being configured to amplify voltage of the input signal received from its respective one or more electrochemical cells into an output signal, the output signals being supplied simultaneously to a common load;
a current sensor associated with each of the plurality of boost converters, each current sensor being configured to sense a current of the input signal for its associated boost converter prior to amplification of the input signal by the boost converter; and
a controller associated with each of the plurality of boost converters, each controller being configured to adjust the voltage amplification of the associated boost converter in response to the current sensed by the associated current sensor, wherein the adjustment decreases the amplification as the current sensed increases based on demand from the load;
wherein the boost converters and their controllers are independent of one another such that the boost converters operate independently of one another to cause the respective currents of the input signals to trend towards mutual equilibrium,
wherein each controller is further configured to:
receive a fixed reference voltage;
adjust the fixed reference voltage in response to the current sensed by the current sensor into a voltage reference;
adjust the voltage reference in response to the output voltage into a current reference; and
adjust the current reference in response to the current sensed by the current sensor into an error output associated with the current reference,
wherein each controller is further configured to adjust the voltage reference in response to the output voltage by:
scaling the output voltage relative to fixed reference voltage as a scaled output voltage; and
subtracting the scaled output voltage from the fixed reference voltage.

9. A system comprising:
a plurality of boost converters each coupled to a respective one or more electrochemical cells for receiving an input signal therefrom, each of the boost converters being configured to amplify voltage of the input signal received from its respective one or more electrochemical cells into an output signal, the output signals being supplied simultaneously to a common load;

a current sensor associated with each of the plurality of boost converters, each current sensor being configured to sense a current of the input signal for its associated boost converter prior to amplification of the input signal by the boost converter; and a controller associated with each of the plurality of boost converters, each controller being configured to adjust the voltage amplification of the associated boost converter in response to the current sensed by the associated current sensor, wherein the adjustment decreases the amplification as the current sensed increases based on demand from the load;

wherein the boost converters and their controllers are independent of one another such that the boost converters operate independently of one another to cause the respective currents of the input signals to trend towards mutual equilibrium, wherein each controller is further configured to:

receive a fixed reference voltage;

adjust the fixed reference voltage in response to the current sensed by the current sensor into a voltage reference;

adjust the voltage reference in response to the output voltage into a current reference; and adjust the current reference in response to the current sensed by the current sensor into an error output associated with the current reference, wherein each controller is further configured to adjust the current reference by:

converting the current sensed by the current sensor into a voltage associated with the current; and subtracting the voltage associated with the current from the current reference.

10. The system of claim 9, wherein each controller is further configured to adjust the current reference by subtracting a software-generated current adjustment from the voltage associated with the current.

11. The system of claim 10, wherein the software-generated current adjustment is received as a user input.

12. The system of claim 2, wherein each boost converter comprises a pulse width modulator, and wherein each controller is configured to adjust the amplification of the boost converter by receiving the error output associated with the current reference into the pulse width modulator.

13. The system of claim 2, wherein the respective one or more electrochemical cells coupled to each boost converter is a plurality of electrochemical cells, and wherein each of the plurality of boost converters receives the input signal from its respective plurality of electrochemical cells.

14. The system of claim 13, wherein the electrochemical cells comprise metal air cells.

15. The system of claim 2, wherein the one or more power electrochemical cells are coupled in parallel to a voltage bus.

16. The system according to claim 2, wherein the boost converters are also configured to operate independently of one another to also cause the voltages of the output signals to trend towards equilibrium.

* * * * *